3,117,970
3,4-BENZOAPORPHINE AND DERIVATIVES THEREOF
Jerry A. Weisbach, Cherry Hill, N.J., assignor to Smith Kline & French Laboratories, Philadelphia, Pa., a corporation of Pennsylvania
No Drawing. Filed Oct. 11, 1962, Ser. No. 229,992
7 Claims. (Cl. 260—283)

This invention relates to the new 3,4-benzoaporphine and derivatives thereof which have pharmacodynamic activity. More specifically the new compounds of this invention have antipyretic and central nervous system depressant activity.

The novel 3,4-benzoaporphines of this invention are represented by the following structural formula:

FORMULA I

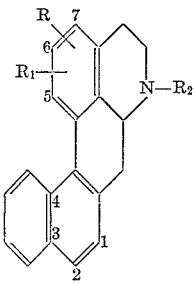

when:

R represents hydrogen or lower alkoxy, preferably methoxy;

$R_1$ represents hydrogen, lower alkoxy, preferably methoxy, or, when taken together with R, methylenedioxy and $R_2$ represents hydrogen or lower alkyl having 1–4 carbon atoms.

This invention also includes pharmaceutically acceptable salts of the above defined bases formed with nontoxic organic and inorganic acids. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic, methanesulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-halotheophyllines, for example, 8-bromotheophylline. Exemplary of such inorganic salts are those with hydrochloric, hydrobromic, sulfuric, sulfamic, phosphoric and nitric acids. Of course, these salts may also be prepared by the classical method of double decomposition of appropriate salts which is well-known to the art.

In addition, this invention includes pharmaceutically acceptable, nontoxic quaternary ammonium salts of the above defined bases formed with, for example, a reactive lower alkyl halide, sulfate, p-toluene sulfonate, benzene sulfonate or lower alkyl sulfonate.

Further objects of this invention are novel N-benzyl intermediates for the preparation of the 3,4-benzonoraporphines of Formula I.

The N-unsubstituted-3,4-benzoaporphine ring system is referred to herein as 3,4-benzonoraporphine, the designation "nor" indicating the absence of a methyl group on the nitrogen atom of the ring system.

The N-lower alkyl-3,4-benzonoraporphines of this invention are prepared by the following procedure:

*Procedure 1*

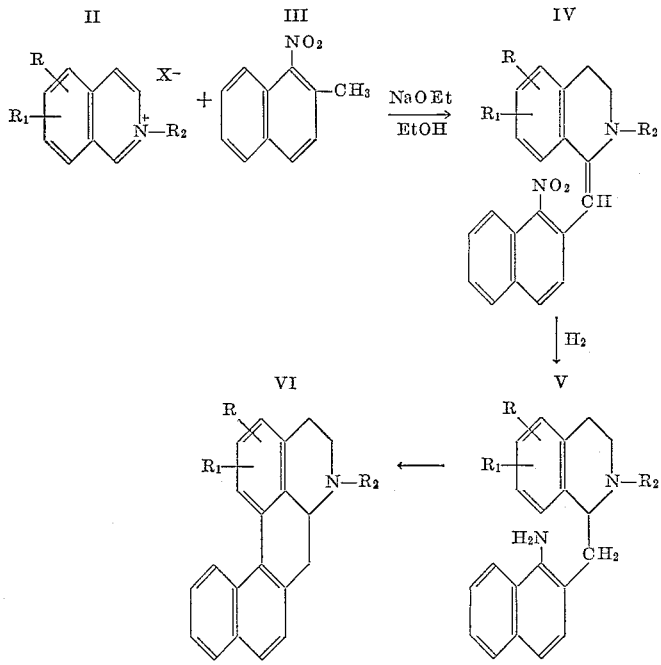

The terms R and $R_1$ are as defined above, $R_2$ is lower alkyl and X is an anion, for example, halogen.

According to the above procedure an isoquinolinium salt is condensed with 1-nitro-2-methylnaphthalene in alcoholic base such as sodium alkoxide in a lower alkanol. The reaction is carried out at about 18–45° C. conveniently at room temperature to give the 1-(1'-nitro-2'-naphthal)-2-lower alkyl - 1,2,3,4 - tetrahydroisoquinoline intermediate. Hydrogenation of this intermediate in lower alkanol solution in the presence of a catalyst such as platinum oxide or palladium-in-charcoal gives the 1-(1'-amino-2'-naphthylmethyl)-2-lower alkyl-1,2,3,4-tetrahydroisoquinoline intermediate.

Cyclization by the Pschorr procedure of the 1-(1'-amino-2'-naphthylmethyl)-2-lower alkyl-1,2,3,4-tetrahydroisoquinoline dihydrochloride, prepared by treating the base with excess ethereal hydrogen chloride, gives the N-lower alkyl-3,4-benzonoraporphines of this invention.

Alternatively, the 1-(1'-amino-2'-naphthylmethyl)-2-lower alkyl-1,2,3,4-tetrahydroisoquinoline intermediate of Formula V in which there is a substituent other than hydrogen in the 6-position is prepared by the following procedure:

as described above and removal of the protective N-benzyl group from the resulting N-benzyl-3,4-benzonoraporphine by catalytic hydrogenation using a palladium catalyst such as palladium-on-charcoal in an inert organic solvent such as ethanol gives 6-substituted-3,4-benzonoraporphine.

By a modification of Procedure 2 as described by Sugasawa and Tachikawa, Tetrahedron 4:205–212 (1958), 6-unsubstituted-3,4-benzonoraporphines of Formula I are prepared by condensing β-cyclohexa-1,4-dienylethylamine with 1-nitro-2-naphthalene acetyl chloride to give an amide which is cyclized by the Bischler-Napieralski reaction as described above to give the 1-(1'-nitro-2'-naph-

*Procedure 2*

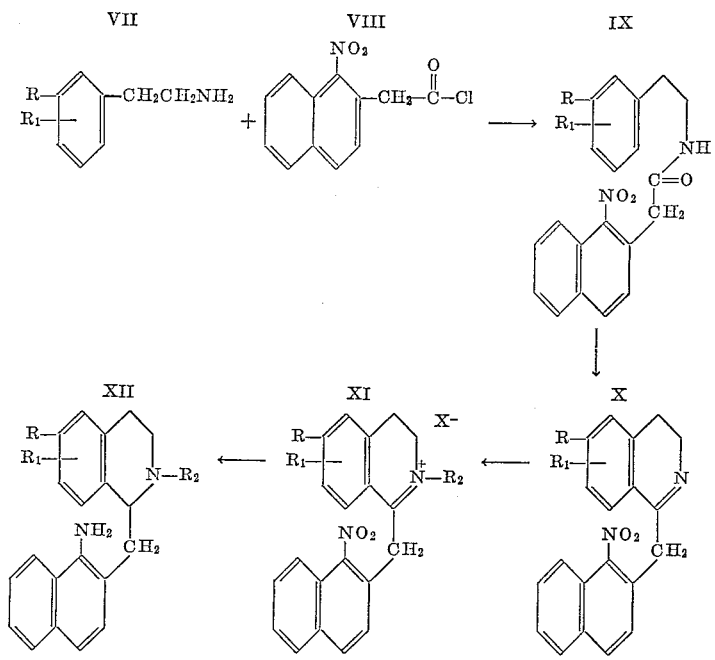

The terms $R_1$ is as defined above; $R_2$ is lower alkyl; R is lower alkoxy or, when taken together with $R_1$, methylenedioxy and X is a halide anion.

According to the above procedure, a 3-substituted phenethylamine is condensed with 1-nitro-2-naphthalene acetyl chloride to give an amide which is cyclized by the Bischler-Napieralski reaction using a dehydrating agent such as phosphorous oxychloride in an anhydrous hydrocarbon solvent such as benzene or toluene at elevated temperature, conveniently at the reflux temperature of the reaction mixture, for a reaction period of about 15–120 minutes.

The resulting 1-(1'-nitro-2'-naphthylmethyl)-3,4-dihydroisoquinoline is treated with a lower alkyl halide to give the corresponding N-lower alkyl isoquinolinum halide. Reduction of this intermediate with a bimetallic hydride such as sodium borohydride and treatment of the product with zinc dust and sulfuric acid gives the 1-(1'-amino-2'-naphthylmethyl)-2-lower alkyl-1,2,3,4-tetrahydroisoquinoline intermediate of Formula XII.

The 3,4-benzonoraporphines of Formula I in which $R_2$ is hydrogen and R is lower alkoxy or, taken together with $R_1$, is methylenedioxy are prepared by treating the 1-(1'-nitro-2'-naphthylmethyl)-3,4-dihydroisoquinoline of Formula X with a benzyl halide such as benzyl bromide in a nonaqueous, inert, organic solvent such as benzene to give the N-benzyl derivative, reducing this derivative with a bimetallic hydride and treating with zinc dust and sulfuric acid to give the intermediate of Formula XII in which $R_2$ is benzyl. Cyclization by the Pschorr procedure thylmethyl)-3,4-dihydroisoquinoline of Formula X. Introduction of the protective N-benzyl group as described above, cyclization by the Pschorr procedure and catalytic hydrogenation to remove the N-benzyl moiety gives the 6-unsubstituted-3,4-benzonoraporphines of this invention. Alternatively, introduction of an N-lower alkyl group on the intermediate of Formula X and Pschorr cyclization gives the 6-unsubstituted-N-lower alkyl-3,4-benzonoraporphines of this invention.

The following examples are not limiting but are illustrative of compounds of this invention.

EXAMPLE 1

Isoquinoline methiodide (100 g.) and 70 g. of 2-methyl-1-nitronaphthalene are added to a warm ethanol solution of sodium (25 g.). The resulting solution is kept at 25° C. for 24 hours and filtered to yield solid material which is recrystallized from methanol to give 1-(1'-nitro-2'-naphthal)-2-methyl-1,2,3,4-tetrahydroisoquinoline.

A mixture of 26.1 g. of 1-(1'-nitro-2'-naphthal)-2-methyl-1,2,3,4-tetrahydroisoquinoline, 4.0 g. of platinum oxide and 300 ml. of absolute ethanol is hydrogenated for 25 minutes. After filtration and concentration in vacuo, there is obtained, as the residue, 1-(1'-amino-2'-naphthylmethyl)-2-methyl-1,2,3,4-tetrahydroisoquinoline which on treatment with ethyl acetate ethereal hydrogen chloride, filtration and recrystallization from methanol-ethanol gives the dihydrochloride salt.

A solution of 3.6 g. of sodium nitrite in 35 mg. of water is added dropwise to a cold, stirred solution of 17.7 g. of 1-(1'-amino-2'-naphthylmethyl)-2-methyl-1,2, 3,4-tetrahydroisoquinoline dihydrochloride in 240 ml. of acetic acid and 18 ml. of sulfuric acid. The mixture is kept at 5–10° C. for 15 minutes, then treated with 1.5 g. of sulfamic acid, 1.5 g. of cuprous chloride and 850 ml. of cold 3 N sulfuric acid. The resulting mixture is stirred and heated on a steam bath for 20 minutes. Zinc dust (25 g.) is added and the stirring and heating is continued for an additional 30 minutes. The hot solution is filtered and the filtrate is cooled with ice, made alkaline with ammonia and extracted with chloroform. The extract is washed with saturated sodium chloride solution, dried over sodium sulfate and concentrated in vacuo. The resultant oil is chromatographed on an alumina column prepared in benzene and using benzene as eluent to give 3,4-benzoaporphine.

Treatment of the base with aqueous hydrochloric acid, filtration and recrystallization from methanol gives 3,4-benzoaporphine hydrochloride.

EXAMPLE 2

A mixture of 18.1 g. of 3,4-dimethoxyphenethylamine and 24.9 g. of 1-nitro-2-naphthalene acetyl chloride in 300 ml. of benzene and 30 ml. 10% sodium hydroxide is stirred for two hours and filtered to give 1-nitro-2-naphthyl-N-(3',4'-dimethoxyphenethyl)acetamide.

Ten grams of the above prepared acetamide is treated with 15 ml. of phosphorus oxychloride in toluene. The mixture is refluxed for one hour, then cooled and treated with light petroleum to separate a layer which is decanted. The residue is treated with water and ammonia solution and extracted into chloroform. The chloroform extract is concentrated in vacuo to give 1-(1'-nitro-2'-naphthylmethyl) - 6,7 - dimethoxy-3,4-dihydroisoquinoline.

The resulting 3,4-dihydro-6,7-dimethoxy-1-(1'-nitro-2'-naphthylmethyl)isoquinoline is treated with methyl iodide in benzene to give, after heating on a steam bath, cooling and evaporating the solvent, 1-(1'-nitro-2'-naphthylmethyl) - 2 - methyl-6,7-dimethoxy-3,4-dihydroisoquinolinium iodide.

To a warm stirred solution of 10.0 g. of the above prepared isoquinolinium iodide derivative in methanol is added 5.0 g. of sodium borohydride. The mixture is stirred for one hour, evaporated to dryness in vacuo and treated with chloroform and water. The chloroform layer is washed with water and with saturated sodium chloride solution and dried over sodium sulfate. The solvent is removed in vacuo. The residue is triturated with absolute ethanol to yield a solid which on recrystallization from ethanol gives 1-(1'-nitro-2'-naphthylmethyl)-2-methyl-6,7-dimethoxy-1,2,3,4 - tetrahydroisoquinoline. Reduction of the nitro group is accomplished by treating with zinc dust and sulfuric acid at 15° C. The mixture is filtered, made alkaline with ammonia and extracted with chloroform. Evaporating the extract to dryness and recrystallizing the residue from ethanol gives 1 - (1'-amino-2'-naphthylmethyl)-2-methyl-6,7-dimethoxy - 1,2,3,4 - tetrahydroisoquinoline.

By the procedure of Example 1 using sodium nitrite in acid solution the 1-(1'-amino-2'-naphthylmethyl) - 2-methyl-6,7-dimethoxy - 1,2,3,4 - tetrahydroisoquinoline prepared above is cyclized to give 5,6-dimethoxy-3,4-benzoaporphine.

The free base in ether is treated with an equal molar amount of glacial acetic acid to give, after evaporation of the solvent, the acetate salt.

EXAMPLE 3

By the procedure of Example 2, 3,4-methylenedioxyphenethylamine is reacted with 1 - nitro-2-naphthalene acetyl chloride to give 1-nitro-2-naphthyl-N-(3',4'-methylenedioxyphenethyl)acetamide which is treated with phosphorous oxychloride in toluene to yield 1-(1'-nitro-2'-naphthylmethyl) - 6,7 - methylenedioxy - 3,4-dihydroisoquinoline.

Treating the above prepared dihydroisoquinoline with methyl iodide and treating the resulting methyl isoquinolium iodide with sodium borohydride in methanol followed by reduction of the nitro group using zinc dust and sulfuric acid gives 1-(1'-amino-2'-naphthylmethyl)-2 - methyl - 6,7-methylenedioxy-1,2,3,4-tetrahydroisoquinoline.

By the Pschorr procedure of Example 1, the above prepared isoquinoline derivative is cyclized to give 5,6-methlenedioxy-3,4-benzoaporphine.

Treating the above prepared base with methyl chloride in ethanol gives the methiodide salt. Similarly reacting the base with ethyl p-toluenesulfonate in ethanol gives the ethyl p-toluenesulfonate salt.

EXAMPLE 4

By the procedure of Example 1 using N-ethyl isoquinolinium iodide and N-n-propyl isoquinolinium iodide in place of isoquinolinium methiodide of Example 1 there is obtained N-ethyl-3,4-benzonoraporphine and N-n-propyl-3,4-benzonoraporphine, respectively.

EXAMPLE 5

According to the procedure of Example 1, 5-methoxy-N-methylisoquinolinium iodide is reacted with 2-methyl-1-nitronaphthalene and the resulting intermediate is converted to 7-methoxy-3,4-benzoaporphine.

Similarly using 7-methoxy-N-methylisoquinolinium iodide as the starting material 5-methoxy-3,4-benzoaporphine is obtained.

EXAMPLE 6

A mixture of 12.3 g. of β-cyclohexa-1,4-dienylethylamine and 25.0 g. of 1-nitro-2-naphthalene acetyl chloride in benzene and 10% sodium hydroxide solution is stirred for two hours, then filtered to give 1-nitro-2-naphthyl-N-(β-cyclohexa-1,4-dienylethyl)-acetamide.

Refluxing the above prepared amide with phosphorus oxychloride in benzene for one hour and working up as in Example 2 gives 1-(1'-nitro-2'-naphthylmethyl)-3,4-dihydroisoquinoline.

A mixture of 10.0 g. of 1-(1'-nitro-2'-naphthylmethyl)-3,4-dihydroisoquinoline and 19.0 g. of benzyl bromide in 50 ml. of benzene is heated at reflux for four hours. Cooling and filtering gives 1-(1'-nitro-2'-naphthylmethyl)-2-benzyl-3,4-dihydroisoquinolinium bromide. This quaternary salt is treated with sodium borohydride, then with zinc dust and sulfuric acid as in Example 2 to give 1-(1'-amino-2'-naphthylmethyl)-2-benzyl - 1,2,3,4 - tetrahydroisoquinoline.

Cyclization of the above prepared isoquinoline by the procedure of Example 1 gives N-benzyl-3,4-benzonoraporphine.

Hydrogenating 5.0 g. of N-benzyl-3,4-benzonoraporphine in 95% ethanol using 1.0 g. of 10% palladium-on-charcoal and 10 ml. of hydrochloric acid at three atmospheres of hydrogen for 16 hours, filtering, concentrating, adding ether and collecting the product by filtration gives 3,4-benzonoraporphine hydrochloride. The free base is obtained by dissolving the hydrochloride salt in water, neutralizing with sodium carbonate, extracting with ether and removing the solvent in vacuo from the extracts.

EXAMPLE 7

Five grams of 1-(1'-nitro-2'-naphthylmethyl)-6,7-dimethoxy-3,4-dihydroisoquinoline, prepared as in Example 2 is heated at reflux in benzene with 8.5 g. of benzyl bromide for four hours to give, after cooling and filtering, 1-(1'-nitro-2'-naphthylmethyl) - 2-benzyl - 6,7 - dimethoxy-3,4-dihydroisoquinolinium bromide.

Reducing, cyclizing and hydrogenating by the procedure of Example 6 gives 5,6-dimethoxy-3,4-benzonoraporphine.

What is claimed is:

1. A chemical compound of the class consisting of a free base and its nontoxic, pharmaceutically acceptable, acid addition and quaternary ammonium salts, the free base having the formula:

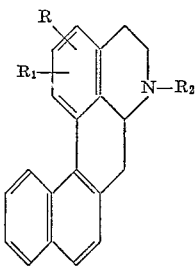

in which:
R is a member selected from the group consisting of hydrogen and lower alkoxy;
$R_1$ is a member selected from the group consisting of hydrogen, lower alkoxy and, when taken together with R, methylenedioxy, and
$R_2$ is a member selected from the group consisting of hydrogen and lower alkyl having 1–4 carbon atoms.

2. A chemical compound of the formula:

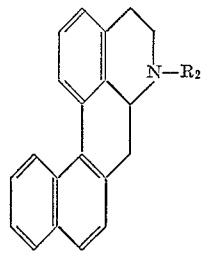

in which $R_2$ is lower alkyl having 1–2 carbon atoms.

3. 3,4-benzoaporphine.
4. 3,4-benzoaporphine hydrochloride.
5. A chemical compound of the formula:

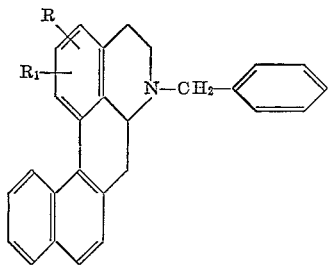

in which:
R is a member selected from the group consisting of hydrogen and lower alkoxy and
$R_1$ is a member selected from the group consisting of hydrogen, lower alkoxy and, when taken together with R, methylenedioxy.

6. A chemical compound of the formula:

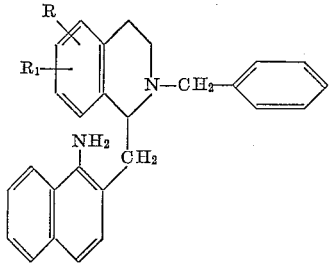

in which:
R is a member selected from the group consisting of hydrogen and lower alkoxy and
$R_1$ is a member selected from the group consisting of hydrogen, lower alkoxy and, when taken together with R, methylenedioxy.

7. A chemical compound of the formula:

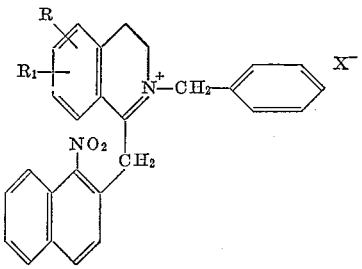

in which:
R is a member selected from the group consisting of hydrogen and lower alkoxy;
$R_1$ is a member selected from the group consisting of hydrogen, lower alkoxy and, when taken together with R, methylenedioxy; and
X is a halide anion.

No references cited.